United States Patent [19]

Toyama et al.

[11] Patent Number: 5,150,023
[45] Date of Patent: Sep. 22, 1992

[54] METHOD AND APPARATUS FOR INDEXING MOVING PORTION OF ROBOT TO ORIGIN

[75] Inventors: Osamu Toyama, Kariya; Akira Shimokoshi, Toyoake; Takashi Kawasaki, Nagoya, all of Japan

[73] Assignee: Toyoda Koki Kabushiki Kaisha, Kariya, Japan

[21] Appl. No.: 841,801

[22] Filed: Feb. 26, 1992

[30] Foreign Application Priority Data

Feb. 28, 1991 [JP] Japan ................... 3-34414

[51] Int. Cl.⁵ .............................................. G05B 13/00
[52] U.S. Cl. .................................... 318/567; 318/561; 318/568.10; 901/40; 901/15
[58] Field of Search ................... 318/560–620; 901/3, 9, 15, 5, 6, 40, 41, 38, 47; 33/544.5; 395/84, 96

[56] References Cited

U.S. PATENT DOCUMENTS

| | | | |
|---|---|---|---|
| 3,808,696 | 5/1974 | Possati | 33/544 J |
| 4,332,066 | 6/1982 | Hailey et al. | 901/15 X |
| 4,404,505 | 9/1983 | Swanson et al. | 318/561 |
| 4,469,993 | 9/1984 | Swanson et al. | 318/561 |
| 4,561,816 | 12/1985 | Dingess | 901/41 X |
| 4,987,676 | 1/1991 | Amorosi | 901/40 X |
| 5,074,741 | 12/1991 | Johansson | 901/6 |

Primary Examiner—Paul Ip
Attorney, Agent, or Firm—Oblon, Spivak, McClelland, Maier & Neustadt

[57] ABSTRACT

Herein disclosed are a method and an apparatus for indexing a moving portion of a robot to a mechanical origin. First and second reference holes are formed respectively in the moving portion and a holding portion supporting the moving portion relatively movably. A plug gauge used has a foot to be fitted in the first reference hole and a probe attached to the foot and sized to be inserted into the second reference hole. The plug gauge is fitted in the first reference hole, and the moving portion is then moved in a first direction relative to the holding portion by operating a drive unit. This relative movement of the moving portion is stopped when the probe of the plug gauge comes into contact with the inner wall of the second reference hole. Then, the drive unit is operated to move the moving portion relatively in a second direction opposed to the first direction, and this relative movement of the moving portion is stopped when the probe of the plug gauge comes again into contact with the inner wall of the second reference hole. Thus, the central position of the moving stroke of the moving portion in the second direction is determined as the mechanical origin on the basis of the output of a position detector.

9 Claims, 9 Drawing Sheets

METHOD AND APPARATUS FOR INDEXING MOVING PORTION OF ROBOT TO ORIGIN

BACKGROUND OF THE INVENTION

1. Field of the Invention

The present invention relates to a method and an apparatus for indexing a moving portion of a robot to a mechanical orgin.

2. Description of the Prior Art

In the prior art, there is known a robot which is constructed to include a base, a first arm having its one end borne in a swinging manner by the base, and a second arm having its one end borne in a swinging manner by the other end of the first arm. This robot is driven to operate by a servomotor which in turn is controlled by a control unit.

In order to control the motions of the robot accurately, the individual arms have their reference positions stored as mechanical origins so that they have to be indexed to the mechanical origins before the storage. Japanese Utility Model Laid-Open No. 171095/1984 has disclosed an origin indexing apparatus of plug gauge type. According to this disclosure, adjacent arms are formed with holes or grooves for determining their positional relations so that the origins are indexed by inserting a rod-shaped plug gauge closely into those holes or grooves. Specifically, the worker moves the arms to align the holes or grooves formed therein and then inserts the plug gauge into the holes or grooves.

In order to enhance the accuracy in the origin indexing, however, the gaps between the holes or grooves and the plug gauge has to be minimized. Thus, it is difficult to position the holes or grooves of the arms in alignment thereby to allow the plug gauge to be inserted thereinto.

SUMMARY OF THE INVENTION

The present invention has been conceived to solve the problems thus far described and has an object to provide a method and an apparatus capable of indexing the moving portion of a robot simply and highly accurately to a mechanical origin.

In short, according to the present invention, first and second reference holes are formed respectively in the moving portion and a holding portion supporting the moving portion relatively movably. A plug gauge used has a foot to be fitted in the first reference hole and a probe attached to the foot and sized to be inserted into the second reference hole. The plug gauge is fitted in the first reference hole, and the moving portion is then moved in a first direction relative to the holding portion by operating a drive unit. This relative movement of the moving portion is stopped when the probe of the plug gauge comes into contact with the inner wall of the second reference hole. Then, the drive unit is operated to move the moving portion relatively in a second direction opposed to the first direction, and this relative movement of the moving portion is stopped when the probe of the plug gauge comes again into contact with the inner wall of the second reference hole. Thus, the central position of the moving stroke of the moving portion in the second direction is determined as the mechanical origin on the basis of the output of a position detector.

Incidentally, the term "reference hole" to be used in the present invention should include not only a round hole but also a square or polygonal hole, an arc having a face to be engaged by a probe at least in first and second direction, and a groove having a square section.

Since a plug gauge equipped with a probe having a smaller size than that of the reference hole is used in the present invention, the probe of the plug gauge can be easily inserted into the second reference hole to improve the working efficiency drastically. According to the present invention, moveover, a highly accurate origin indexing can be achieved without any influence from the backlashes from the gear mechanism in a drive unit for driving the moving portion.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

The present invention will be described in the following in connection with the embodiments thereof with reference to the accompanying drawings.

Figure 1:
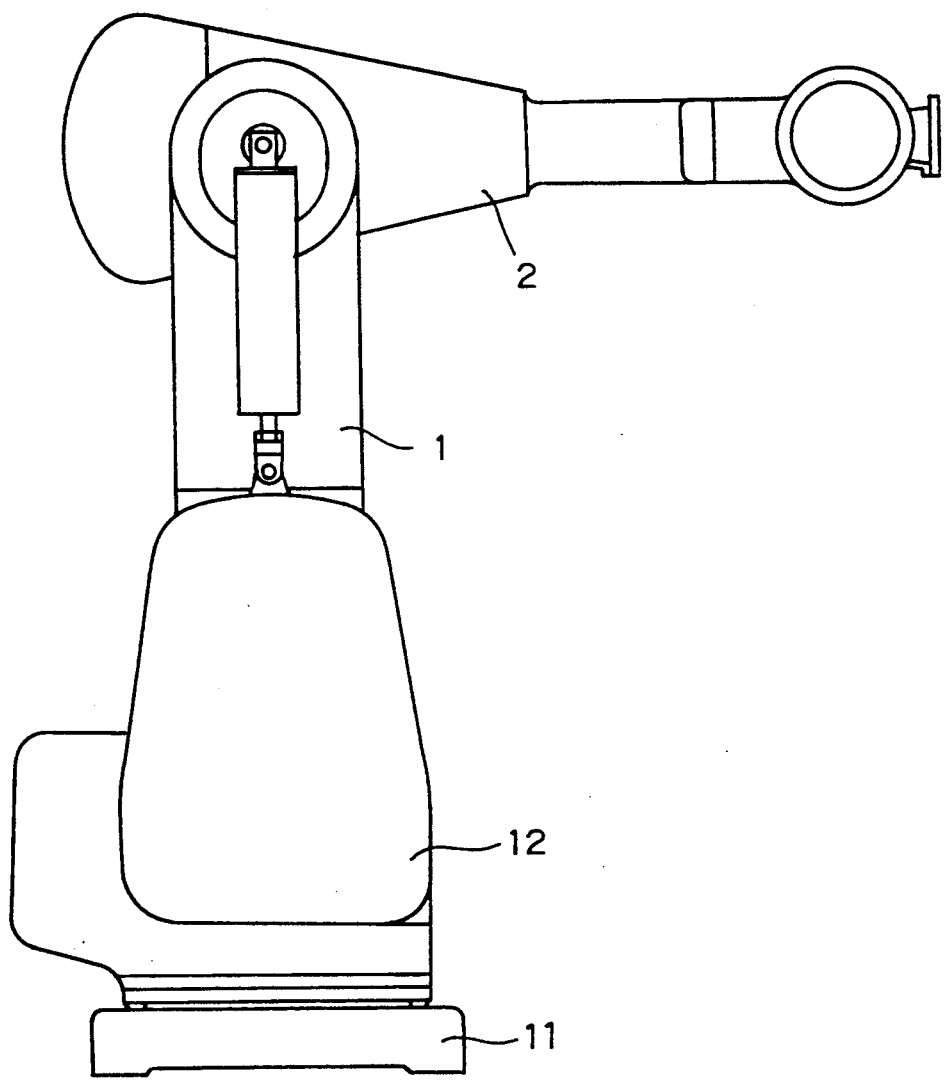
FIG. 1 is a side elevation showing a robot according to an embodiment of the present invention.
Figure 2:
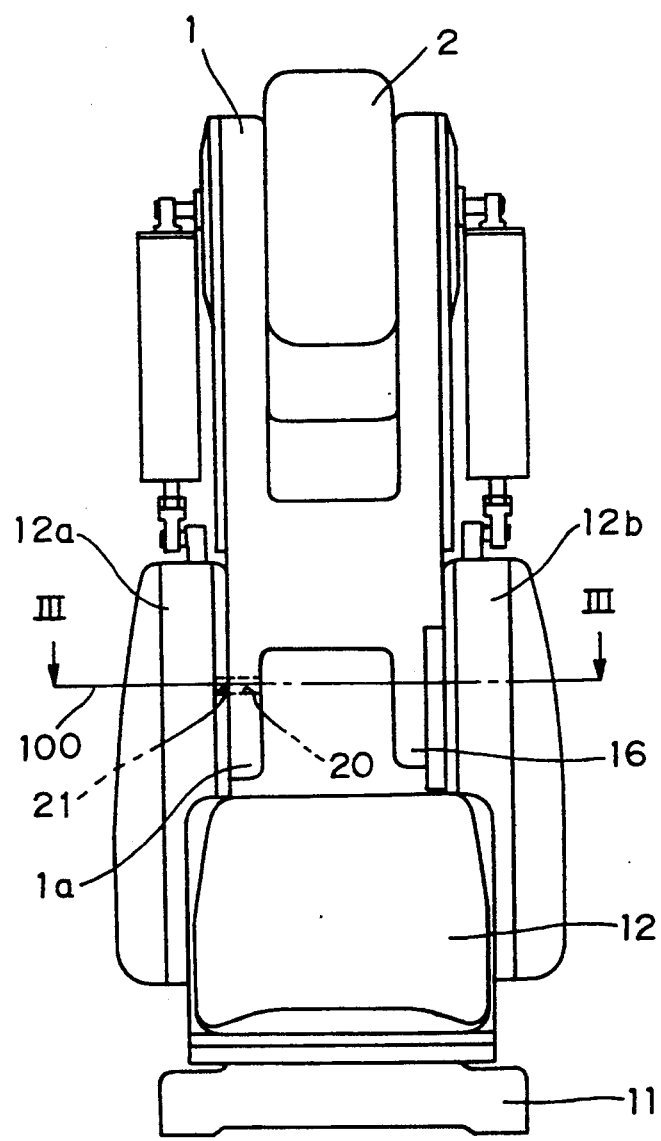
FIG. 2 is a back elevation showing the robot shown in FIG. 1.

As shown in FIGS. 1 and 2, a robot equipped with an origin indexing device according to the present embodiment is a six-axis type multi-articulated robot. This robot is constructed to include: a base 11 placed on a floor; a rotator 12 mounted on the base 11 to swivel on a vertical axis; a first arm 1 supported by the rotator 12 swing on a horizontal axis 100; and a second arm 2 supported at the leading end of the first arm 1 to swing on a horizontal axis.

Since this robot is of the six-axis type having six moving portions, it is equipped with six origin indexing devices. However, the present embodiment will be described in connection with a device for indexing the first arm 1 with respect to the rotator 12.

Figure 3:
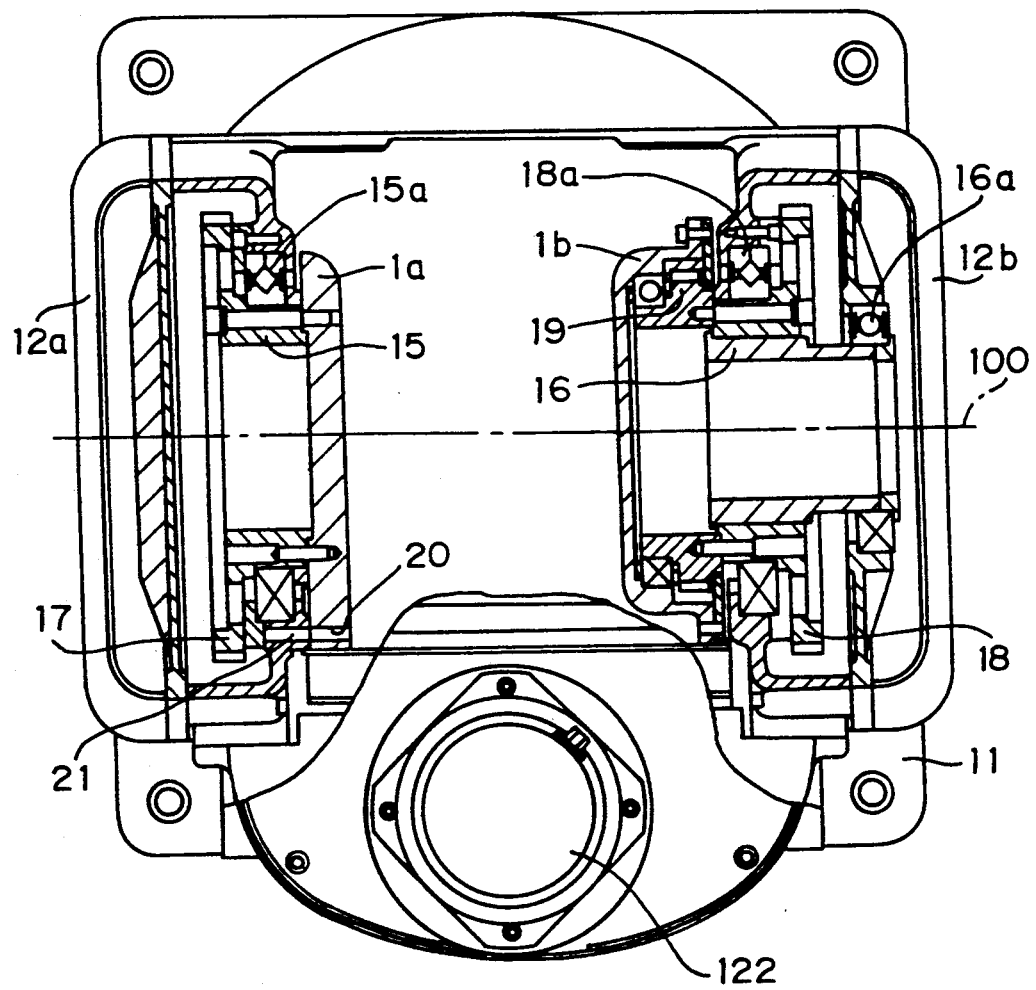
FIG. 3 is a section taken along line III—III of FIG. 2.
Figure 4:
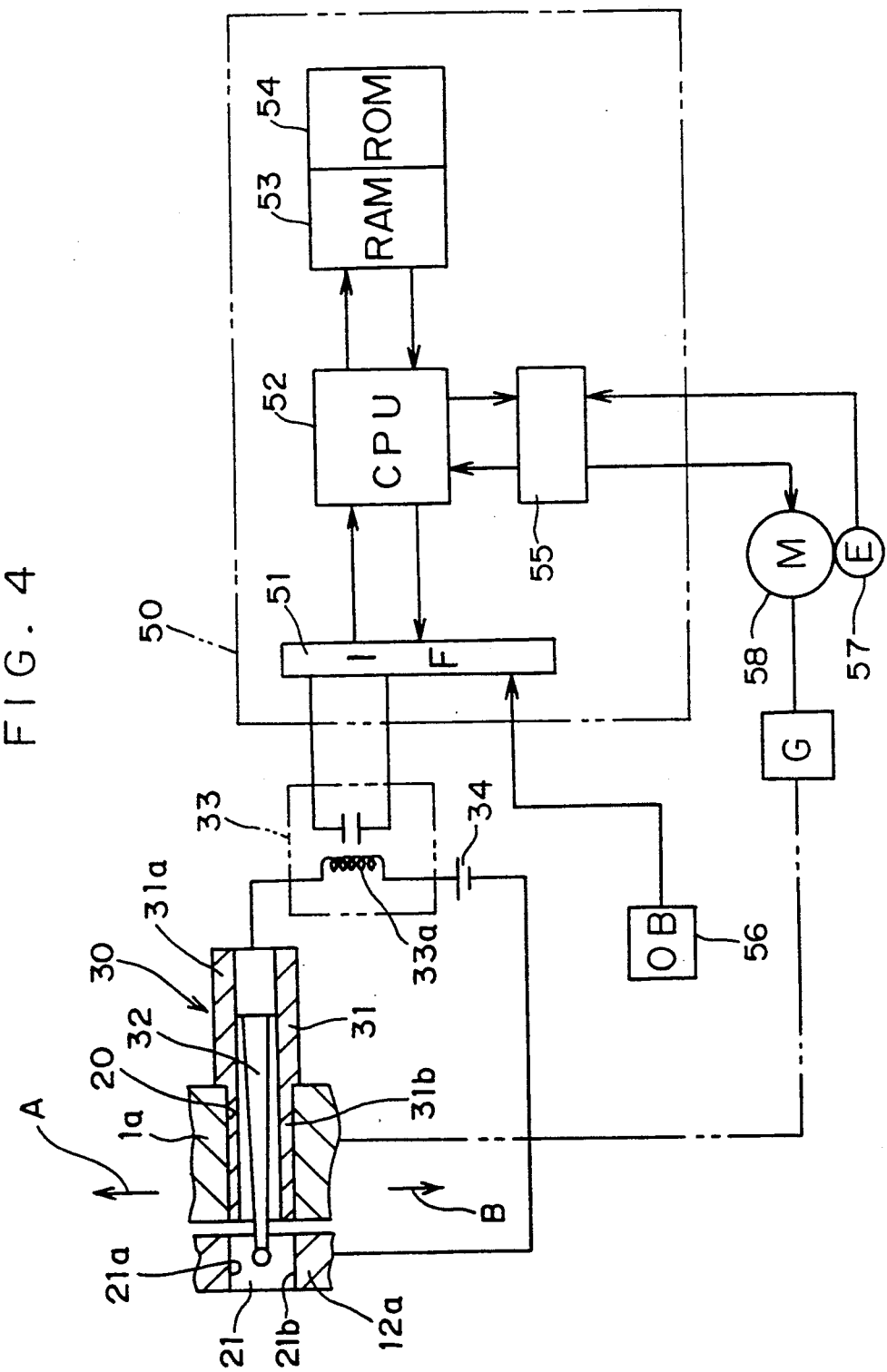
FIG. 4 presents a section showing a plug gauge as well as a block diagram showing a control unit.
Figure 5:
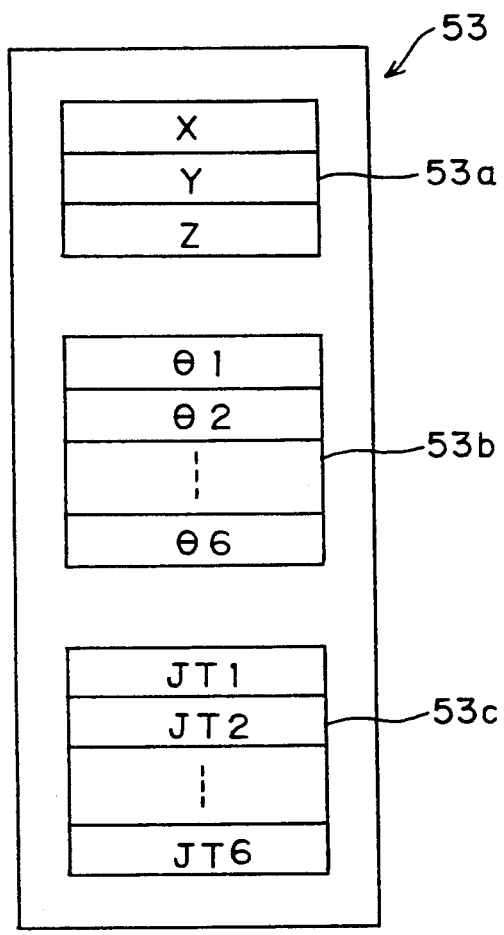
FIG. 5 is a diagram showing the content of a RAM shown in FIG. 4.

FIG. 3 is a section taken along line III—III of FIG. 2. In the rotator 12, there is disposed a servomotor 122 for driving the rotator 12. This rotator 12 is bifurcated to have shoulders 12a and 12b constituting a support portion. The first arm 1 has its lower end bifurcated to have pivoting portions 1a and 1b, which are respectively supported by the shoulders 12a and 12b through swing shafts 15 and 16. Here, the swing shaft 15 and the swing shaft 16 are supported to rotate on the axis 100. Specifically, the swing shaft 15 is supported by the shoulder 12a through a bearing 15a and has its one end fitted in a recess formed in the pivoting portion 1a and fixed to the pivoting portion 1a by bolts. Moreover, the swing shaft 15 is integrally formed at its other end with a gear 17. Between this gear 17 and a not-shown first arm driving servomotor (as shown in FIG. 4), there is interposed a gear train for transmitting the rotation of the first arm driving servomotor to the first arm 1. On the other hand, the swing shaft 16 has one end supported by the shoulder 12b through a bearing 16a. The other end of the swing shaft 16 is integrated therearound with gears 18 and 19 for transmitting the driving force of a not-shown second arm driving servomotor to the second arm 2. Moreover, the gear 18 is rotatably supported by the shoulder 12b through a bearing 18a.

As shown in FIGS. 2 and 3, the pivoting portion 1a of the first arm 1 is formed with a first reference hole 20 for indexing the first arm 1 to its origin with respect to the rotator 12. Moreover, this rotator 12 has its shoulder 12a formed with a second reference hole 21, which is aligned to the first reference hole 20 at the time of indexing operation.

FIG. 4 presents both a section showing a plug gauge to be used for indexing operation and a block diagram showing a structure of a control circuit.

A plug gauge 30 is constructed to include a cylindrical foot 31 made of an insulating material, an a rod probe 32 made of a conductive material and having its root fitted in the foot 31. This foot 31 is composed of a larger-diameter portion 31a and a smaller-diameter portion 31b which has a length substantially equal to the depth of the first reference hole 20 of the first arm 1. Moreover, the smaller-diameter portion 31b has a diameter substantially equal to that of the first reference hole 20 so that it is accurately fitted in the first reference hole 20. On the other hand, the probe 32 has a generally spherical leading end protruding from the smaller-diameter portion 31b.

When the first arm 1 is to be indexed to the origin, the first arm 1 is moved to have its reference hole 20 aligned to the second reference hole 21 formed in the shoulder 12a. After this, the plug gauge 30 is fitted in the first reference hole 20 of the first arm 1, as shown in FIG. 4. As a result, the leading end of the probe 32 is inserted into the second reference hole 21 formed in the shoulder 12a.

Next, the structure of the control circuit will be described in the following. The probe 32 of the plug gauge 30 is connected with one end of a coil 33a of a relay 33, the other end of which is connected with the shoulder 12a of the rotator 12 through a power supply 34. And, an ON signal of the relay 33 is transmitted to a robot control device 50. Here, the relay 33 and the power supply 34 constitute together contact detecting means for detecting that the probe 32 comes into contact with the inner wall of the second reference hole 21.

The robot control device 50 is constructed to include: a CPU 52: a ROM 54 stored with an operation control program, an orgin indexing program and so on; a RAM 53 stored with teaching data; a servomotor drive circuit 55 for controlling the servomotors for driving the individual drive shafts of the robot; and an interface 51. The aforementioned relay 33 is connected with the CPU 52 through the interface 51. With the CPU 52, on the other hand, there is connected through the interface 51 an operating box 56 which is used for teaching operation, indexing operation and so on. Incidentally, although the servomotor drive circuit 55 is provided for each of the six moving portions, only one drive circuit for driving a first arm driving servomotor 58 is shown in FIG. 4 so as to simplify the description.

The servomotor 58 is coupled to the pivoting portion 1a of the first arm 1 through a gear mechanism G having a reduction ratio Kg. The rotational angle position of the first arm 1 is detected by an absolute encoder 57 connected to the servomotor 58. The encoder 57 has its oputput valve fed back to the CPU 52 through the servomotor drive circuit 55. The encoder 57 may be constructed by combining an incremental encoder with a counter.

The RAM 53 is equipped with: a present position memory area 53a for storing the present position coordinates (X, Y, Z) of the hand portion of the robot in the orthogonal coordinate system; an angle position memory area 53b for storing the rotational angle positions ($\theta 1$, $\theta 2$, ———, and $\theta 6$) of the individual moving portions of the robot; and an origin data (JT1, JT2, ———, and JT6) indicating mechanical origins of the the individual moving portions. Incidentally, the origin data (JT1, JT2, ———, and JT6) are the output values of the encoder 57 at the time when the individual moving portions are indexed to the mechanical orgins.

Next, here will be described both the works for indexed the first arm 1 to the orgin with respect to the rotator 12 and the operations of the CPU 52. First of all, the worker uses the operating box 56 to move the first arm 1 by the JOG operation thereby to align the first reference hole 20 at the side of the first am 1 generally with the second reference hole 21 at the side of the rotator 12. The worker then inserts the plug gauge 30 from the first reference hole 20 into the second reference hole 21. At this time, only the smaller-diameter portion 31b is fitted in the first reference hole 20 due to a step formed between the larger- and smaller-diameter portions 31a and 31b of the cylindrical foot 31, so that only the leading end of the probe 32 protruding from the smaller-diameter portion 31b is inserted into the second reference hole 21. Here, the leading end of the projecting probe 32 is far smaller than the diameter of the second reference hole 21 so that the accuracy required for the worker to align the first and second reference holes 20 and 21 is not severe.

Figure 6:
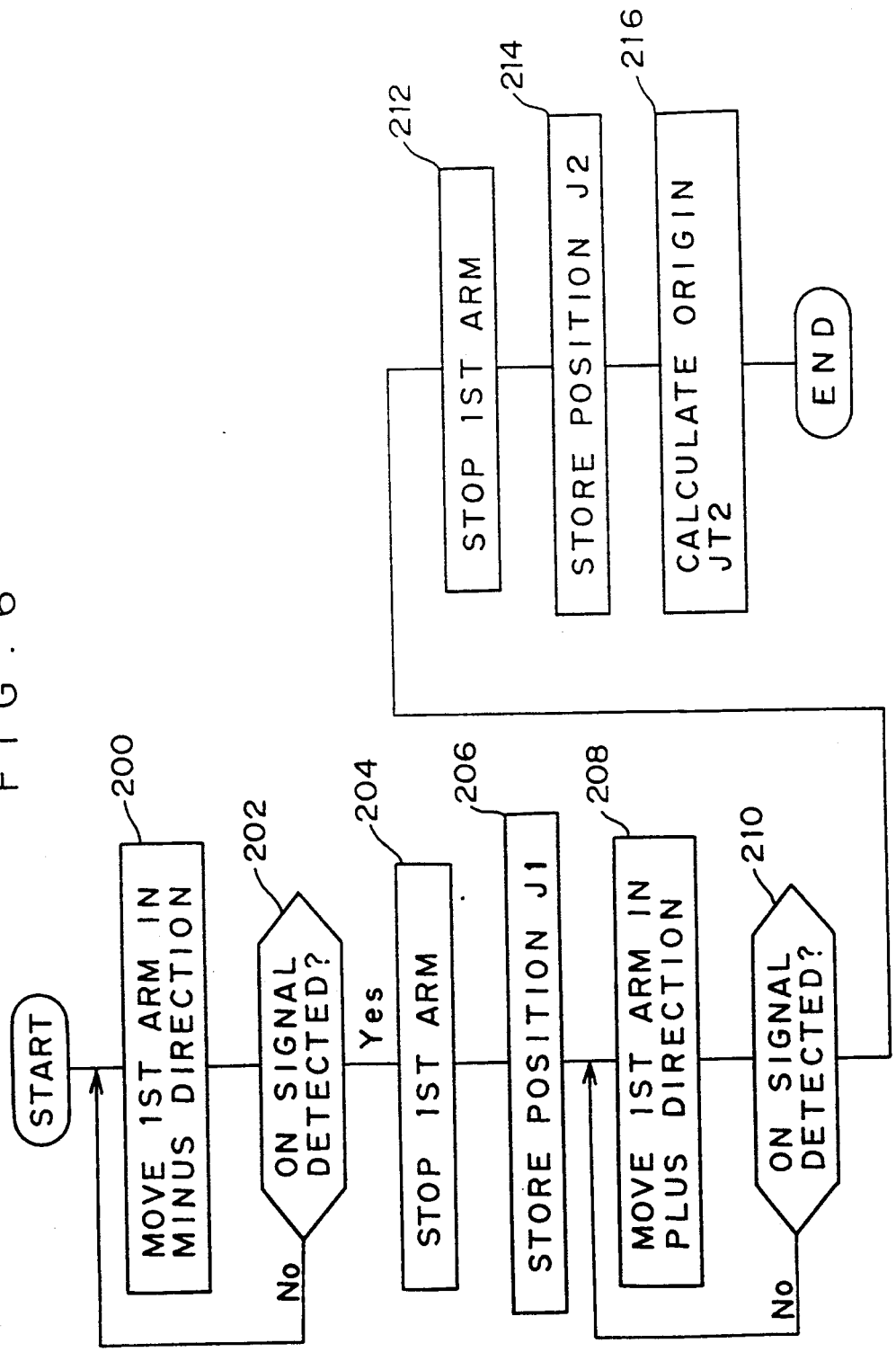
FIG. 6 is a flow chart showing the operations of the CPU shown in FIG. 4.

When all the foregoing works are completed, the worker operates a specific switch on the operating box 56 to instruct the robot control device 50 the start of the origin indexing operation. Then, the CPU 52 executes the procedures of the flow chart shown in FIG. 6 on the basis of the origin indexing program stored in the ROM 54.

Figure 9:
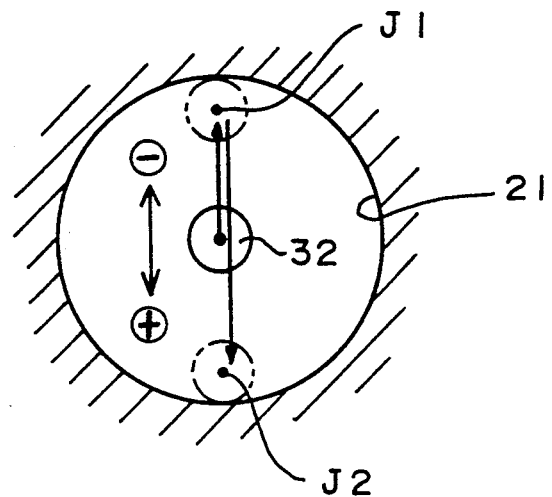
FIGS. 9 and 10 are diagrams for explaining the origin indexing operations.
Figure 10:
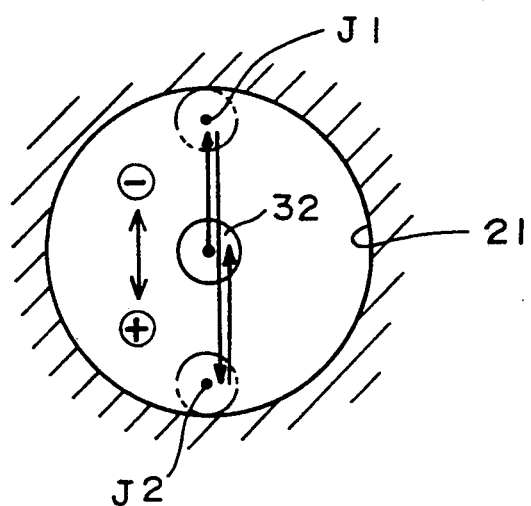

At Step 200, the first arm 1 is moved shortly by a predetermined small angle $\theta$ in a minus direction (or A direction). As a result, the leading end of the probe 32 is moved in the minus direction, as shown in FIG. 9. At Step 202, it is decided on the basis of the ON signal coming from the relay 33 whether or not the leading end of the probe 32 has come into contact with an inner 21a of the second reference hole 21 at one side. If YES, the procedures advance to Step 204. If NO, on the contrary, the procedures return to Step 200, at which the first arm 1 is shortly moved again by the small angle $\theta$ in the minus direction, and the identical procedures are repeated.

When the procedures advance from Step 202 to Step 204, the movement of the first arm 1 is stopped. After this, at Step 206, the present position of the encoder 57, i.e., the position in which the first arm 1 stops is read from the encoder 57 and its stored as J1 in the RAM 53.

At Step 208, the first arm 1 is moved shortly by the small angle $\theta$ in the direction opposite to that of Step 200, i.e., in a plus direction (or B direction).

It is then decided at Step 210 whether or not the leading end of the probe 32 has come into contact with an inner wall 21b of the second reference hole 21 at the other side. If YES, the procedures advance to Step 212. If NOT, on the contrary, the procedures return to Step 208, at which the first arm 1 is shortly moved again by the small angle $\theta$ in the plus direction, and the identical procedures are repeated.

When the procedures advance from Step 210 to Step 212, the movement of the first arm 1 is stopped. After this, at Step 241, the present position of the encoder 57, i.e., the position in which the first arm 1 stops is read from the encoder 57 and is stored as J2 in the RAM 53.

At Step 216, the value indicating the origin JT2 of the first arm 1 is calculated by the following Equation from the positions J1 and J2, which are stored at Steps 206 and 212, and is stored in the origin data memory area 53c of the RAM 53:

$$JT2 = (J1 + J2)/2.$$

Since the gear mechanism G having the reduction ratio Kg is interposed between the servomotor 58 and the first arm 1, the rotational angle position $\theta 2$ is calculated from the following Equation:

$$\theta 2 = (U \cdot E2 - JT2))/Kg,$$

wherein:
U: Unit detection angle of the encoder 57; and
E2: Output value of the encoder 57.

By this Equation, the CPU 52 periodically calculates the angle position of the first arm 1 to update the data $\theta 2$ of the angle position memory area 53b of the RAM 53. Similar procedures are carried out for the remaining moving portions.

In case, on the other hand, the first arm 1 is moved to a target angle position $\theta$, the CPU 52 calculates a target encoder value ET2 from the following Equation and outputs it to the drive circuit 55:

$$ET2 = ((\theta T2 \cdot Kg)/U + JT2.$$

As a result, the first arm 1 is moved to the target angle position $\theta T2$. Since, at this time, the target encoder value is corrected by using the data JT2 indicating the mechanical origin of the first arm 1, this arm 1 is accurately positioned with reference to the mechanical origin. Similar procedures are carried for the remaining moving portions.

As has been described hereinbefore, the plug gauge 30 can be simply inserted by generally aligning the first reference hole 20 at the side of the first arm 1 and second reference hole 21 at the side of the rotator 12, and the origin can be automatically indexed quickly without any error that might otherwise be caused by the difference in the worker. Since, moreover, the positional coordinates of the inner walls 21a and 21b of the second reference hole 21 are detected by moving the first arm 1 in both the plus and minus directions and since their median is used as the origin, the backlashes in the plus and minus directions can be mutually canceled to effect a highly accurate origin indexing without any influence from the backlashes of the gear mechanism for driving the first arm 1.

In the foregoing embodiment, the positions J1 and J2 of the first arm 1 at the time when the probe 32 comes into contact with two inner walls 21a and 21b of the second reference hole 21, by moving the first arm 1 both the plus and minus directions. In the following modification, however, only the position J1 of the first arm 1 at the time when the probe 32 comes into contact with the one-side inner wall 21a of the second reference hole 21 is stored, and the origin of the first arm 1 is determined on the basis of both the position J1 and the movement amount of the first arm 1 from the position J1 to the position J2.

Figure 7:
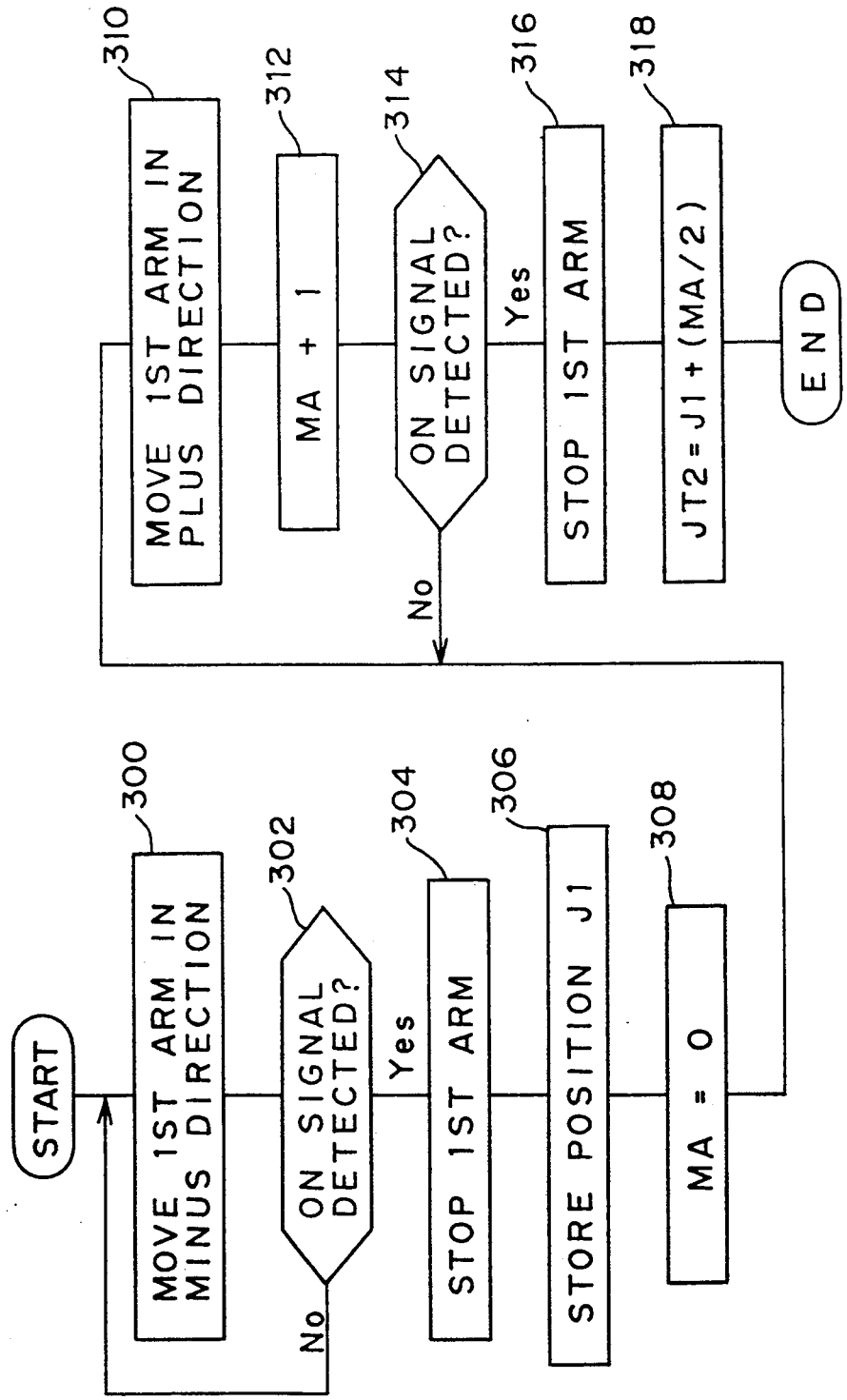
FIG. 7 is a flow chart showing a first modification.

FIG. 7 is a flow chart showing this modification. The procedures from Step 300 to Step 306 are identical to those of Steps 200 to 206 of FIG. 6. By these procedures, the first arm 1 is moved in the minus direction, and the position J1 at the time when the probe 32 comes into contact with the second reference hole 21 is stored. At subsequent Step 308, a value MA indicating the movement amount is initially set to zero. At Steps 310 to 316, the first arm 1 is then moved in the plus direction while updating the movement MA till the probe 32 reaches the position J2. And, the mechanical origin JT2 of the first arm 1 is calculated by the following Equation:

$$JT2 = (J1 + (MA/2)).$$

Figure 8:
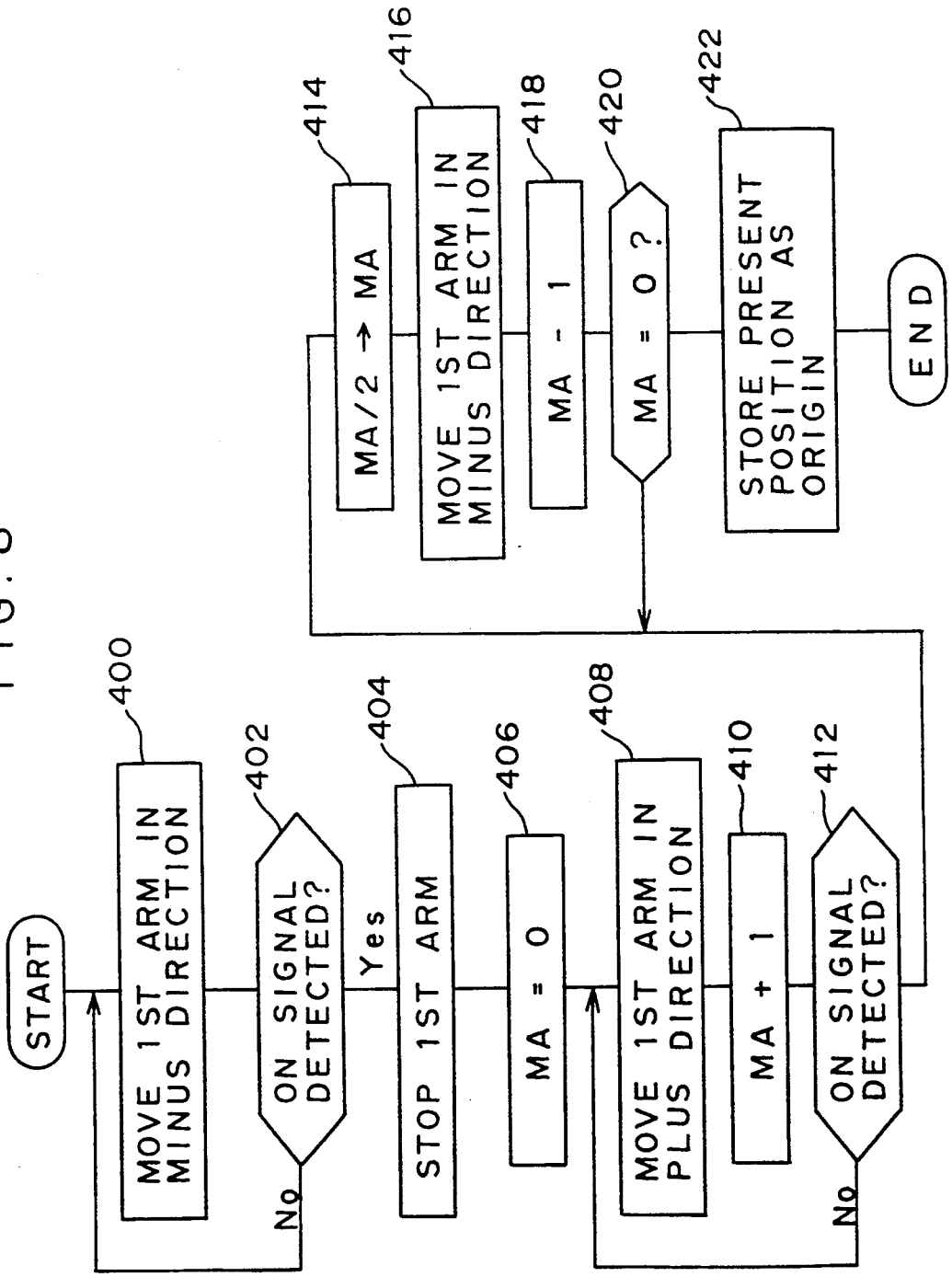
FIG. 8 is a flow chart showing another modification.

FIG. 8 is a flow chart showing another modification. The procedures from Step 400 to Step 404 are identical to those of Steps 200 to 206 of FIG. 6. At subsequent Step 406, the value indicating the movement amount is initially set to zero. In the subsequent procedures of Steps 408 to 412, the first arm 1 is then moved in the plus direction while updating the movement MA till the probe 32 reaches the position J2. As a result, the value MA coresponds to the distance between the positions J1 and J2. After this, the value MA is divided by 2 at Step 414, and the first arm 1 is moved in the minus direction by a distance corresponding to MA/2 in the procedures of Steps 416 to 420. As a result, the probe 32 is moved to the center between the positions J1 and J2. At Step 422, the out-put value of the encoder 57 at this time is stored as the mechanical origin of the first arm 1.

Incidentally in the foregoing embodiments, the first arm 1 is the moving portion, and the rotator 12 is the support portions. And, the first reference hole 20 is formed in the first arm 1, and the second reference hole 21 is formed in the shoulder 12a of the rotator 12. In dependence upon the shape of the robot, however, the first reference hole 20 may be formed in the shoulder 12a of the rotator 12, and the second reference hole 21 may be formed in the first arm 1.

Although the foregoing embodiments are constructed to have the first arm 1 moved automatically a short distance, they may be modified such that the worker moves the first arm 1 through the operating box 56 and stops the first arm 1 in response to the ON signal indicating that the leading end of the probe 32 has come into contact with the inner wall of the second reference hole 21 and such that the stop position is stored.

Moreover, the embodiments have been described in connection with the origin indexing of the first arm 1 with respect to the rotator 12 but can be likewise used for indexing the remaining five moving portions such as the rotator with respect to the base 11 or the second arm 2 with respect to the first arm 1.

Moreover, the first reference hole 20 may have a square or polygonal shape, and the second reference hole 21 may be shaped to have any section such as a square, polygonal, an arc of a circle or a square groove if it shaped to have such a face as can be contacted by the probe in the plus and minus directions. All of these shapes should be included by the term "hole" in the present embodiment.

Obviously, numerous modifications and variations of the present invention are possible in light of the above teachings. It is, therefore, to be understood that within the scope of the appended claims, the present invention may be practiced otherwise than as specifically described herein.

What is claimed is:

1. In a robot including at least one moving portion adapted to be driven by a drive unit and a position detector for detecting the position of said moving portion,
a method for indexing the moving portion of said robot to a mechanical origin, comprising the steps of:
forming first and second reference holes respectively in said moving portion and a holding portion supporting said moving portion relatively movably;
positioning said moving portion by operating said drive unit such that said first reference hole may be generally aligned to said second reference hole;
fitting in said first reference hole a plug gauge which includes a foot adapted to be fitted in said reference hole and a probe attached to said foot and adapted to be inserted into said second reference hole;
moving said moving portion relative to said holding portion in a first direction by operating said drive unit;
stopping the relative movement of said moving portion when the probe of said plug gauge comes into contact with the inner wall of said second reference hole;
moving said moving portion relative to said holding portion in a second direction opposed to said first direction by operating said drive unit;
stopping the relative movement of said moving portion when the probe of said plug gauge comes again into contact with the inner wall of said second reference hole; and
determining the central position of the moving of said moving portion in said second direction as said mechanical origin on the basis of the output of said position detector.

2. A method of indexing the moving portion of said robot to said mechanical origin, according to claim 1, further comprising the steps of: detecting the position of said moving portion as a first position when the relative movement in said first direction is stopped; detecting the position of said moving portion as a second position when the relative movement in said second direction is stopped; and calculating the average value of said first position and said second position as said central position.

3. A method of indexing the moving portion of said robot to said mechanical origin, according to claim 1, further comprising the steps of: detecting the position of said moving portion as a reference position when the relative movement in said first direction is stopped; detecting the stroke of relative movement of said moving portion in said second direction; and calculating the position, which is offset in said second direction from said reference position by a half of said stroke of relative movement, as said central position.

4. A method of indexing the moving portion of said robot to said mechanical origin, according to claim 1, further comprising the steps of: detecting the stroke of relative movement of said moving portion in said second direction; detecting the position of said moving portion as a reference position when the relative movement in said second direction is stopped; and calculating the position, which is offset in said first direction from said reference position by a half of said stroke of relative movement, as said central position.

5. In a robot including at least one moving portion adapted to be driven by a drive unit and a position detector for detecting the position of said moving portion,
an apparatus for indexing the moving portion of said robot to a mechanical origin, comprising:
first and second reference holes formed respectively in said moving portion and a holding portion supporting said moving portion relatively movably;
a plug gauge including a foot adapted to be fitted in said first reference hole and a probe attached to said foot and adapted to be inserted into said second reference hole;
detection means for detecting that the probe of said plug gauge has come into contact with the inner wall of said second reference hole;
control means for operating said drive unit with said plug gauge being fitted in said first reference hole, to move said moving portion in a first direction relative to said holding portion till the probe of said plug gauge comes into contact with one side of the inner wall of said second reference hole and said moving portion in a second direction opposed to said first direction relative to the same till said probe comes into the other side of the inner wall of said second reference hole; and
arithmetic means for determining the central position of the movement of said moving portion in said second direction on the basis of the output of said a position detector to regard the determined central position as said mechanical origin.

6. An apparatus for indexing the moving portion of said robot to a mechanical origin, according to claim 5, wherein said arithmetic means includes: means for detecting the position of said moving portion as a first position when the relative movement in said first direction is stopped; means for detecting the position of said moving portion as a second position when the relative movement in said second direction is stopped; and means for calculating the average value of said first position and said second position as said central position.

7. An apparatus for indexing the moving portion of said robot to a mechanical origin, according to claim 5, wherein said arithmetic means includes: means for detecting the position of said moving portion as a reference position when the relative movement in said first direction is stopped; means for detecting the stroke of relative movement of said moving portion in said second direction; and means for calculating the position, which is offset in said second direction from said relative position by a half of said stroke of relative movement, as said central position.

8. An apparatus for indexing the moving portion of said robot to a mechanical origin, according to claim 5, wherein said arithmetic means includes: means for detecting said stroke of relative movement of said moving portion in said second direction; means for detecting the position of said moving portion as a reference position when the relative movement in said second direction is stopped; and means for calculating the position, which is offset in said first direction from said reference position by a half of said stroke of relative movement, as said central position.

9. An apparatus for indexing the moving portion of said robot to a mechanical origin, according to claim 5, wherein said plug gauge has its foot made of an insulator and its probe made of a conductive material, and wherein said detection means includes a power supply and a relay, which are connected in series between said probe and a member forming said second reference hole.

* * * * *